W. S. SMITH.
BALL CRANK CONNECTION.
APPLICATION FILED JUNE 30, 1919.
1,328,600.
Patented Jan. 20, 1920.
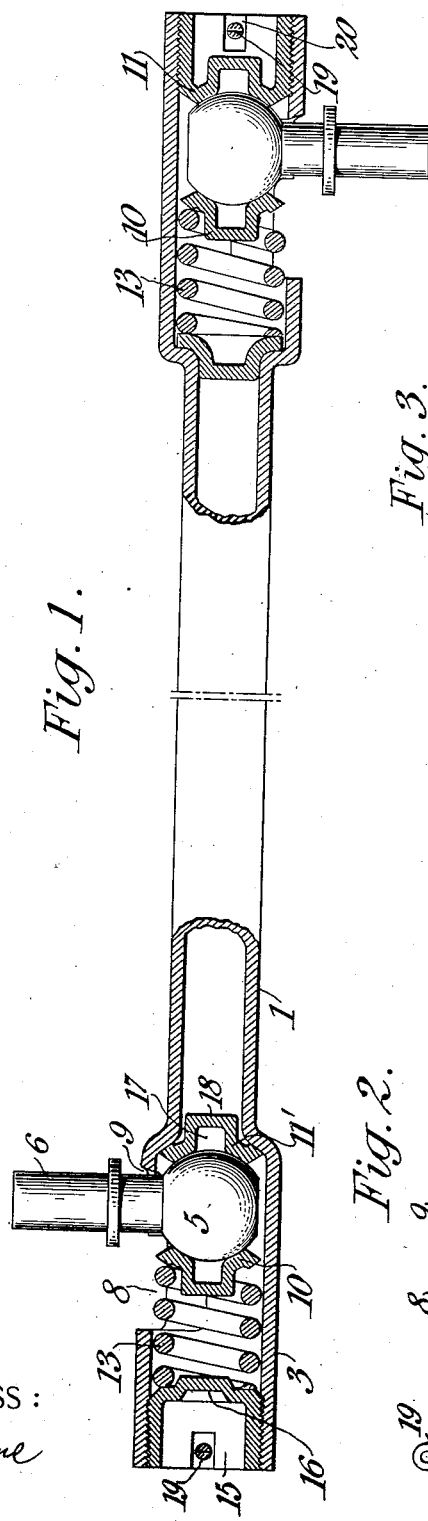
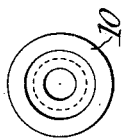
Fig. 3.
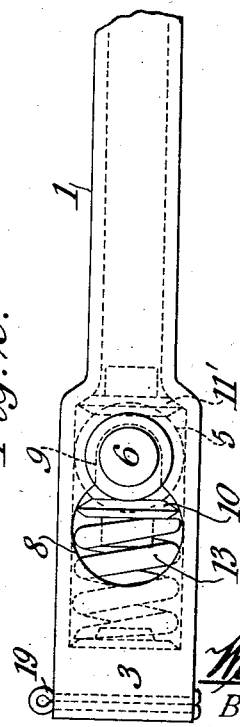
WITNESS:
René Bruine
INVENTOR:
Walter S. Smith
By Attorneys,
Fraser Turk & Myers

UNITED STATES PATENT OFFICE.

WALTER S. SMITH, OF BROOKLYN, NEW YORK.

BALL-CRANK CONNECTION.

1,328,600.	Specification of Letters Patent.	Patented Jan. 20, 1920.

Application filed June 30, 1919. Serial No. 307,546.

*To all whom it may concern:*

Be it known that I, WALTER S. SMITH, a citizen of the United States of America, residing in Brooklyn, in the county of Kings, city and State of New York, have invented certain new and useful Improvements in Ball-Crank Connections, of which the following is a specification.

This invention relates to improvements in ball crank connections, especially of the kind used upon the so-called drag link which constitutes a part of the steering gear of an automobile, and aims to provide improvements therein.

The present invention provides a ball connection which is materially lighter in weight, and, on the other hand, materially stronger and less liable to fracture than those heretofore in use.

The present invention further provides a ball connection in which the parts are more readily and cheaply formed than those heretofore in use.

The invention further provides a construction wherein the friction between parts is less, and wherein a polished surface between the moving parts is more rapidly developed by wear than in those heretofore in use.

The invention further provides a construction wherein the socket parts are provided with means for retaining grease.

Other advantages and points of improvement will be hereinafter set forth.

An embodiment of the invention is illustrated in the accompanying drawing.

In said drawing, Figure 1 shows a drag link, having a ball crank connection at either end, said parts being shown in section.

Fig. 2 is a plan view of one end of the drag link, the view being at 90° with relation to Fig. 1.

Fig. 3 is a face view of one of the parts 10, 11.

In said drawing, numeral 1 designates a bar, preferably tubular, and having a socket or sockets 3 in one, or in both ends.

A ball member 5, conveniently having a stud 6 thereon, fits within the socketed end 3 of the rod 1, being conveniently admitted through an opening 8, provided with a lateral slot 9, adapted to accommodate the stud 6. Socket members or pieces 10, 11, within the socket 3 bear upon the ball 5, the members 10, 11 being resiliently pressed against the ball by means of a spring 13, bearing at one end against one of the socket pieces, and at its other end against a fixed part or abutment within the socket 3. A single spring, bearing against one of the socket pieces is found sufficient in practice, the other socket piece being supported against the socket or a part thereof. As shown at the right hand end of the drag link, the socket member 11, combines with the function of a plug closing one end of the socket 3. As shown at the left hand side of the figure, the socket members 10, 11' are alike, and the spring 13 is interposed between one of the socket members and the end of the socket, the end of the socket being closed by a separately formed plug 15.

The socket members 10 and 11 are formed in such manner that the grain of the metal runs parallel, or substantially parallel, to their bearing faces. The members 10, 11 may be formed in this manner by pressing or stamping from sheet metal. This mode of operation provides a cheap and easy mode of manufacturing said parts. The parts 10, 11 are also preferably formed with recesses 17 in their bearing faces, which recesses serve for the reception of grease, and hence keep the joint well lubricated. A boss or projection 18 is formed upon the face of the socket members opposite the recess 17, and serves as a positioning stud or projection for entering the axial space within a coiled spring, or other part.

Moreover, the bearing face or surface of the parts 10, 11, is preferably in the form of an annulus with a spheroidal surface. When so formed, the said parts need no machining after leaving the forming die, and a polished surface is readily and quickly developed by the wear or rubbing occurring between said ball and the annular spheroidal surface of said socket members. The socket members as described above are practically fractureless under practical conditions of use, and are at the same time materially lighter than the corresponding parts of drag links heretofore in use, thus materially reducing the weight of the drag link, which is of importance, inasmuch as it is highly desirable to reduce the weight of the hanging or suspended parts of automobiles.

The marginal portion of the socket member 11 is preferably bent over into tubular form, and is preferably screw-threaded to engage corresponding screw-threads within the socket 3. The plug 15 is also preferably formed of a cupped piece of sheet metal. It is also preferably formed with a projection 16 for entering axial space within the coiled spring 13. By screwing the pieces 11 or 15 to a greater or less extent within the socket 3, the tension of the spring 13 is modified. Cotter pins 19, passing through holes in the socket 3 and slots in the pieces 11 and 15, serve to keep the members 11 and 15 in adjusted position.

The inventive ideas herein set forth may receive other embodiments than those herein specifically illustrated and described.

What is claimed is:—

1. A ball crank joint, comprising a ball member and a metallic socket member having the grain of the metal substantially parallel to its bearing face.

2. A ball crank joint, comprising a ball member and a metallic socket member having the grain of the metal substantially parallel to its bearing face, said socket member having an indentation in its bearing face, constituting a grease receptacle, said indentation having a correspoding projection on the opposite face of the socket member, constituting a projection for entering the axial space within a coiled spring.

3. A ball crank joint, comprising a ball member and a metallic socket member having the grain of the metal substantially parallel to its bearing face, said socket member having a bent-over tubular marginal portion constituting a plug for fitting within a socket.

4. A ball crank joint comprising a ball member and a metallic sheet metal socket member, having the grain of the metal substantially parallel to its bearing face.

In witness whereof, I have hereunto signed my name.

WALTER S. SMITH.